United States Patent [19]
Ott

[11] 3,893,763
[45] July 8, 1975

[54] LIQUID GATE FOR INDIVIDUAL FILM FRAME PRINTING

[75] Inventor: Howard F. Ott, Victor, N.Y.

[73] Assignee: Eastman Kodak Company, Rochester, N.Y.

[22] Filed: Jan. 31, 1974

[21] Appl. No.: 438,494

[52] U.S. Cl. ............................... 355/52; 354/88
[51] Int. Cl. ............................................. G03b 27/68
[58] Field of Search ......................... 355/52; 354/88

[56] References Cited
UNITED STATES PATENTS

| | | | |
|---|---|---|---|
| 2,446,668 | 8/1948 | Tuttle | 354/88 |
| 2,890,621 | 6/1959 | Suits | 355/52 |

*Primary Examiner*—John M. Horan
*Attorney, Agent, or Firm*—S. W. Gremban

[57] ABSTRACT

A total immersion liquid film gate is disclosed for use in a film projection printer for making prints of format originals or individual film frames. The liquid film gate is provided with cavities on each side of the film frame, and liquid is rapidly flushed through the cavities for filling the cavities and removing dirt from the film frame. Upon completion of the printing exposure, the liquid is cut off and an air-flush is commenced to dry the film. A vacuum slot surrounds the printing aperture for removing the liquid and providing an air return for the gate.

7 Claims, 7 Drawing Figures

LIQUID GATE FOR INDIVIDUAL FILM FRAME PRINTING

BACKGROUND OF THE INVENTION

1. Field of the Invention

This invention relates generally to film gates, and more specifically to an improved liquid film gate for individual stationary film frame printing.

2. Description of the Prior Art

In an optical printing apparatus, the negative and positive films lie in parallel planes which are perpendicular to the optical axis of the printer. The positive film is exposed with the projected image of the negative film at the focal plane of the lens. With repeated use, a film sometimes becomes scratched and dirty. If a scratched and dirty film is used in a printer to make a print, images of the scratches and dirt appear on the print reducing the quality thereof. It is known in the prior art that if a scratched surface of a film is coated with a liquid having the proper refractive index (close to the refractive index of the support and emulsion of the negative), the scratches become practically imperceptible and are not reproduced on the print.

Many gate devices have been developed in the projection printing field (as well as contact printing and film projection fields) for applying liquid to a film surface for reducing the optical defects caused by scratches. These devices have also served to remove dirt from the film. An exemplary liquid film gate device of this type is disclosed in U.S. Pat. No. 3,473,874. Although many developments have been made in film gate technology, there remain several critical areas where improvement is needed. For example, all of the prior total immersion gates strive to replace the film surfaces by optical glass surfaces remote from the film, and to render the space between the optical surfaces optically homogenous by liquid except for the image structure on the film. Also, some of the gates presently in use have portions of the liquid system open to the atmosphere. Other gates tend to leak or do not provide means to remove the liquid from the film once it has been applied. Other gates do not provide means for removing residual air bubbles so that bubble-free wetting of the film surfaces is possible. If such means are not provided, residual air bubbles streak across the aperture of the gate after the film has been substantially wetted, thereby delaying or rendering impossible the making of quality prints. Other gates do not provide means for removing residual liquid droplets remaining in the liquid and air supply passageways so that bubble-free drying of the film surfaces is possible. If such means is not provided, liquid droplets are forced by the drying air across the partially dried film surfaces prolonging the drying process. Only one of the prior art total immersion film gates, of which U.S. Pat. No. 3,614,223 is exemplary, is free of leaking and successfully eliminates occasional bubbles of air in the picture aperture. Leaking is undesirable but can be tolerated to a certain degree. However, bubbles in the picture aperture as indicated earlier cannot be tolerated. In the liquid film gate disclosed in U.S. Pat. No. 3,614,223, the film is moved through the gate and is cleaned, wetted, printed and dried in succession at different positions of film travel through the gate. However, such gate does not provide for bubble-free wetting and rapid drying of stationary film frame. In the film gate of this invention, a dry film frame is inserted into a dry film gate to a stationary position. Liquid is flooded through the gate filling the cavities between the windows and the film surfaces and sweeping away any dirt particles on the wetted surfaces. After the gate is filled with liquid, the exposure is made. The flow of liquid is stopped and a flow of air is initiated that sweeps the liquid from the gate, drying the gate and the film frame. Following the drying action, the film frame is removed to complete the printing operation. In practice, the wetting and drying portion of the printing cycle is rapid, adding only a fraction of a second to the normal dry printing time. The liquid film gate of this invention is believed to solve the aforementioned problems of prior art film gates and to provide a gate having a high degree of convenience and reliability.

SUMMARY OF THE INVENTION

In accordance with a preferred embodiment of the invention, a total immersion liquid film gate is disclosed of the type for use in a projection printer for optically printing a film frame. The liquid film gate comprises a fixed gate member having an upper surface including an optical window defining a printing aperture onto which a film frame is placed. The upper surface has film support lands encircling the window and lying in a plane spaced from a plane in which the upper surface of the window lies to form a cavity between a lower film surface resting on the lands and the upper surface of the window. The upper surface further has a slot completely encircling the lands and window. A movable gate member is provided above and in register with the fixed gate member and has a lower surface including an optical window defining a printing aperture in register with the aforementioned window. The lower surface of the movable gate member also has lands encircling the window and lying in a plane spaced from a plane in which the lower surface of the window lies to form a cavity between an upper film surface engageable by the lands and the lower surface of the window. The lower surface further has a slot encircling the lands and window. The movable gate member is movable between an open position in which it is spaced from the fixed gate member for receiving a film frame therebetween, and a closed position in which the windows and lands are in register and the lands are in contact with opposite surfaces of the film frame interposed therebetween. Means are provided on the fixed and movable gate members for successively directing and guiding a liquid into the cavities and across each side of the film frame from one edge to the other when the gate members are in a closed position for filling the cavities and cleaning the film frame for projection, and then drying air into the cavities and across each side of the film frame for drying the film frame prior to removal thereof from the gate. Vacuum means are connected to at least one of the slots for drawing the liquid and air across the film frame in succession and exhausting it. The liquid film gate is further provided with bleeder holes connecting the liquid and air directing and guiding means to the vacuum means. This provides means for removing any residual liquid or air bubbles from the supply passageways in the liquid gate so that residual air or liquid bubbles will not streak across the film after the film is substantially wetted or dried respectively delaying or rendering impossible the making of quality prints. In the preferred embodiment, the liquid and air directing and guiding means comprises a passageway in each of the fixed and movable gate members in which one end of each passageway is connected to a source of liquid and the opposite end of each passageway is connected to a source of drying air.

It is accordingly one of the objects and advantages of the present invention to provide an improved liquid film gate for individual stationary frame printing.

Another object and advantage of the present invention is to provide an improved liquid film gate in which the liquid and air are supplied in succession to the gate free respectively of air and liquid bubbles.

Another object and advantage of the present invention is to provide an improved liquid film gate in which the liquid system is essentially closed and operates at lower than atmospheric pressure to prevent the escape of liquid or liquid vapor from the gate. Also, the vacuum surrounding the bubble-free liquid supply insures that no air bubbles can enter the cavities.

The invention and its objects and advantages will become more apparent from the detailed description of the preferred embodiment presented below.

BRIEF DESCRIPTION OF THE DRAWING

In the detailed description of the preferred embodiment of the invention presented below, reference is made to the accompanying drawings, in which.

DESCRIPTION OF THE PREFERRED EMBODIMENT

Because film gates are well known, the present description will be directed in particular to elements forming part of, or cooperating more directly with, apparatus in accordance with the present invention. Photographic printing apparatus and film gate elements not specifically shown or described herein should be understood to be selectable from those known in the art.

Figure 5:
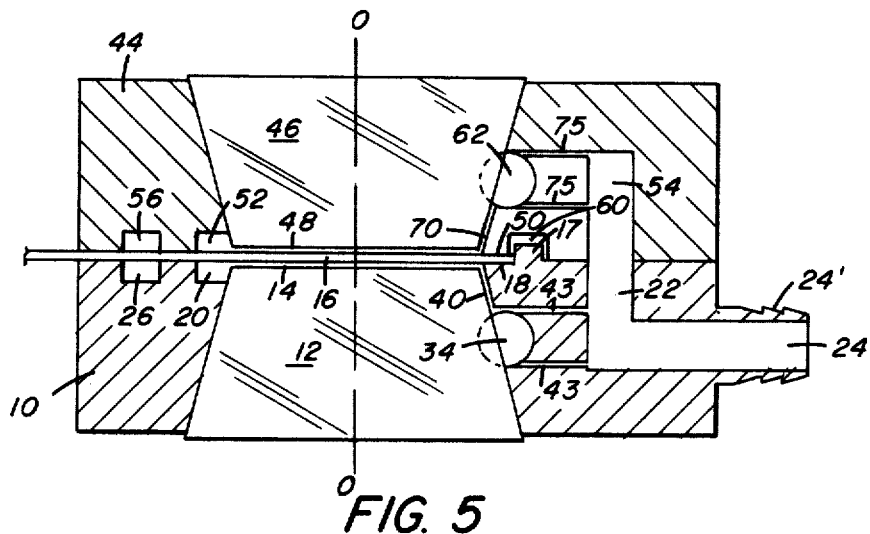
FIG. 5 is an enlarged view in section of the fixed and movable gate members in a closed position taken substantially along line 5—5 of FIG. 1.
Figure 6:
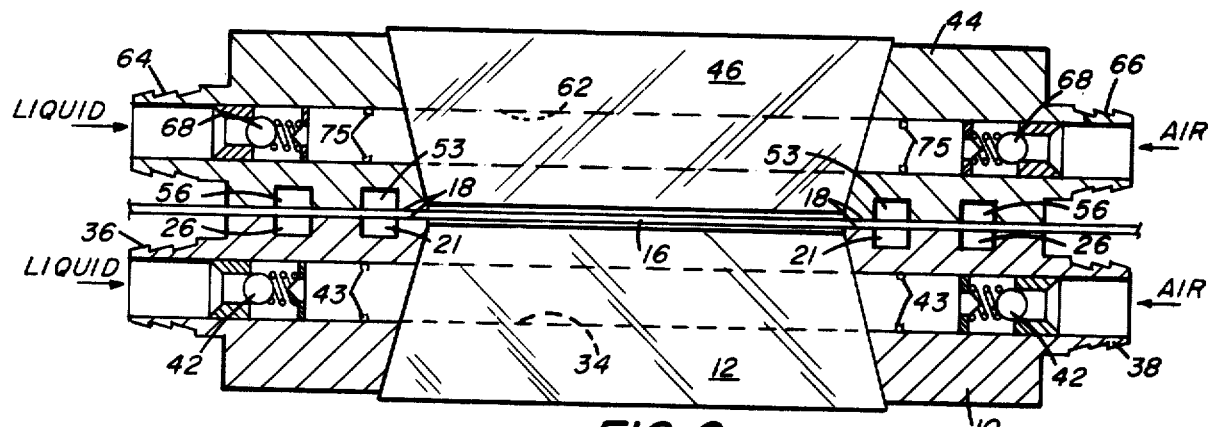
FIG. 6 is an enlarged view similar to FIG. 5 and taken substantially along line 6—6 of FIG. 1.

With reference to the drawings, a preferred embodiment of a liquid film gate is disclosed for use in a photographic projection printer or the like, not shown. The liquid film gate comprises a fixed gate member 10 illustrated in FIGS. 1 and 2 which is mounted by any suitable means, not shown, supported by the photographic projection printer. The fixed gate member 10 comprises a substantially rectangular block having an aperture into which a light-transmitting glass window 12 is mounted. The glass window is relatively thick in the direction of the optic axis "O" (FIG. 5) to effectively replace the film surface on a plane remote from the film plane so that any imperfections in the glass surface are out of focus and any imperfections in the film surface would be optically eliminated. The upper surface of gate member 10 comprises film support lands, of which lands 18 encircle three sides of window 12. The upper surface of window 12 is slightly below the level of the upper surface of the lands as best seen in FIGS. 5 and 6 to provide a cavity 14 for liquid and/or air between the lower surface of a film frame 16 placed on the upper surface of lands 18 and the upper surface of window 12. The individual film frame 16 or a single film frame of a group of film frames on a film strip is normally placed on the upper surface of lands 18 with one edge of the film frame abutting a stop lid 17 as best seen in FIG. 5. The upper surface of gate member 10 has a slit 40 extending along one side of window 12 through which liquid and/or air is introduced into cavity 14. A substantially rectangular slot is provided in the upper surface of the film gate member completely encircling window 12 and having a slot portion 20 for receiving the liquid and/or air after passage through the cavity. Other slot portions 21 spaced from cavity 14 provide ducts for leading the liquid and/or air from slot portion 20 to a slot portion 22 which is deeper than the remainder of the slot to form a vacuum plenum. The plenum 22 is connected by a passageway 24 through a coupling 24' to any suitable source of vacuum. The upper surface of film gate member 10 is further provided with a substantially rectangular groove 26 encircling most of the periphery of slot 20 and having groove ends 28 connected to vacuum plenum 22. Groove 26 is continually purged by bleeder holes 30 and/or notches 32 connected to groove 26, thereby guaranteeing that any liquid escaping the normal vacuum removal system is picked up and returned to the system rather than escaping from the film gate. This is necessary since the vapors of the few known commercially available liquids such as perchlorethylene meeting the conditions essential to their use in a liquid gate are, in sufficient concentration, hazardous to health.

Figure 1:
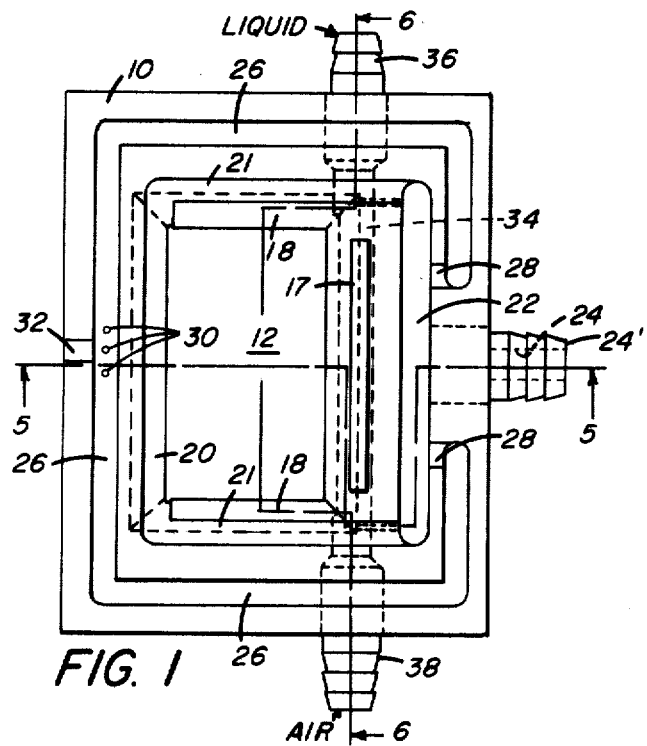
FIG. 1 is a top plan view of a fixed gate member of a liquid film gate of this invention.
Figure 2:
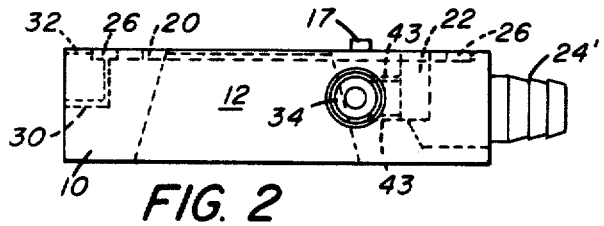
FIG. 2 is an end elevational view of the gate member of FIG. 1.

The film gate member 10 is further provided with a passageway 34 extending therethrough as best seen in FIGS. 1, 2 and 6, and having a coupling 36 at one end for connection to a source of liquid and a coupling 38 at the other end for connection to a source of drying air. The passageway 34 is connected to cavity 14 by slit 40 as best seen in FIG. 5. One-way valves 42 are mounted within couplings 36, 38 to permit movement of the liquid and air in one direction only, namely into passageway 34. When liquid is introduced into supply passageway 34, the action of the vacuum in slot 20 sweeps a curtain of the liquid through cavity 14 from one edge of window 12 to the opposite edge where the liquid is sucked through slot 20, plenum 22 and passageway 24 into the vacuum system to be described hereinafter. The solution flow is continued for a predetermined time to insure complete filling of cavity 14 and to clean the film frame for exposure. Following exposure, the liquid is cut off and air is introduced through supply passageway 34 and slit 40 across cavity 14 to dry the film frame for removal from the gate. In the event any liquid or vapor gets past encircling slot 20, it is picked up by the purged outer groove 26 and directed to the vacuum source. At the time when the liquid is cut off and the air introduced into passageway 34, the passageway is filled with liquid. The bulk of the liquid in passageway 34 is blown ahead of the air through cavity 14 and slots 20 to vacuum. Residual liquid at the ends of passageway 34 are immediately drawn to vacuum through small bleed holes 43 (FIG. 5) connecting passageway 34 to plenum 22.. Also when the gate is filled with liquid the bleed holes drain residual air bubbles from passageway 34 to plenum 22 removing the possibility of air from passageway 34 crossing gate cavity 14 as air bubbles. The bleed holes are tangent to the bottom and top of passageway 34.

Figure 3:
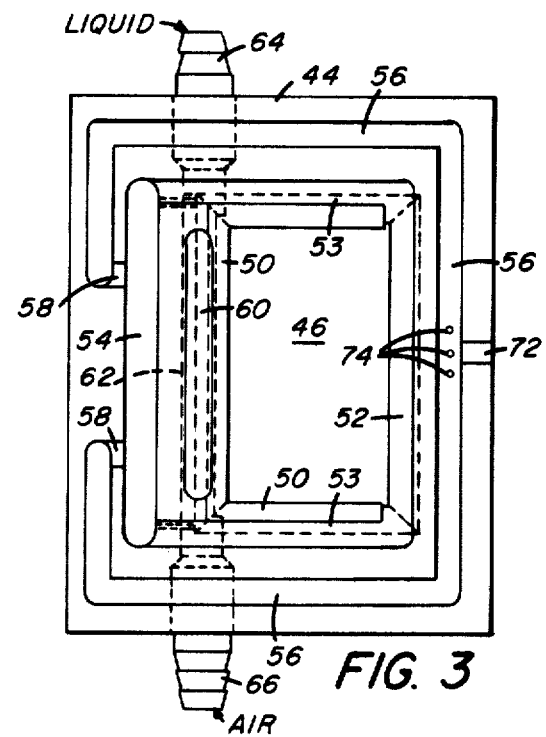
FIG. 3 is a top plan view of the lower surface of a movable gate member placed in an inverted position.
Figure 4:
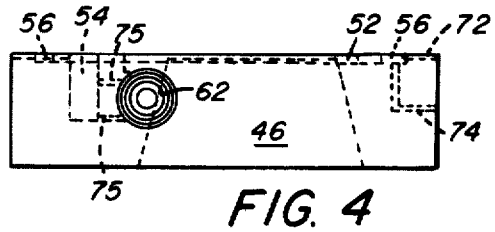
FIG. 4 is an end elevational view of the invention movable gate member of FIG. 3.

The liquid film gate is further provided with a movable gate member 44 as best illustrated in FIGS. 3 and 4 which is similar in many respects to fixed gate member 10. In FIGS. 3 and 4, the movable gate member 44 is shown in its inverted position, and when mounted on the printer is turned from the FIG. 4 position through an angle of 180° to a position above and in register with fixed gate member 10 as best seen in FIG. 5. The upper movable gate member 44 is normally secured to a conventional pivotally mounted yoke, not shown, which is movable by any suitable mechanism for moving upper gate member 44 between an open position, in which it is spaced from gate member 10 to permit insertion of a film frame 16 therebetween, and a closed printing position as best seen in FIG. 5. The movable film gate member 44 has a lower surface as best illustrated in FIG. 3 that is similar to the upper surface of fixed film gate member 10 illustrated in FIG. 1. The movable gate member 44 comprises a substantially rectangular block having an aperture within which a glass window 46 is mounted with the lower surface thereof as seen in FIG. 5 above the surface of the film engaging lands of which lands 50 encircle three sides of window 46. In the printing position, the upper surface of the film frame is spaced from the lower glass window surface to form a cavity 48. The gate member 44 has a slit 70 extending along one side of window 46 through which liquid and/or air is introduced into cavity 48 from a supply passageway 62. A substantially rectangular slot completely encircles cavity 48 and has a portion 52 for receiving the liquid and/or air after passage thereof through the cavity. Other slot portions 53 provide ducts for leading the liquid and/or air from slot portion 52 to a slot portion 54 forming a plenum connected to plenum 22 and to the vacuum source through passageway 24. The gate surface is further provided with a substantially rectangular groove 56 partially encircling slot 52 and having groove ends 58 connected to plenum 54. The upper surface is further provided with a notch 60 for receiving stop lid 17 on gate member 10 (FIG. 5). Supply passageway 62 extending through gate member 44 is provided with a coupling 64 at one end connected to the liquid supply by any suitable means, and a coupling 66 at the opposite end connected by any suitable means to the air supply. Each of the couplings 64, 66 is further provided with a valve 68 as best illustrated in FIG. 6 to permit movement of the liquid and air in one direction only, namely into passageway 62. The aforementioned slit 70 connects passageway 62 to cavity 48 as best seen in FIG. 5. When liquid and/or air is introduced into passageway 62, the action of the vacuum in slot 52 sweeps a curtain of the liquid and/or air through slit 70 and cavity 48 from one edge of the window to the opposite edge and through slot portions 52, 53; plenum 54, 22 and passageway 24 into the vacuum system.

The gate member 44 is further provided with bleed holes 75 similar to bleed holes 43 connecting passageway 62 to plenum 54 (FIG. 5). The bleed holes 43 are tangent to the bottom and top passageway 62. In addition, movable gate member 44 is provided with notches 72 and/or holes 74 connecting grooves 56 to atmosphere whereupon air is bled into groove 56 sweeping any liquid which may have seeped past slot portions 52 and 53 into plenum 22 and passageway 24.

When movable gate member 44 is properly mounted on the projection printer, it is in register with fixed gate member 10 and is movable between an open position to permit the insertion of a film frame 16, and a closed position for projection printing as illustrated in FIG. 5. In this position, the corresponding windows 12, 46 and plenums 22, 54 are in register. The slot portions 20, 21, 52, 53 and grooves 26, 56 of gate members 10, 44 are continuously subjected to a pressure below atmospheric during the operation of the film gate. Accordingly, the processing cavities 14, 48 are completely surrounded by a closed pressure system that is below atmospheric pressure to effectively prevent the escape of liquid or vapor from the gate cavities to atmosphere. It further prevents any air in slot portions 20, 21, 52, 53 or on lands 18, 50 or air from outside the gate from seeping into cavities 14, 48 to form bubbles. Any inflow of air is swept away with the liquid issuing from passageways 34, 62; slits 40, 70 through cavities 14, 48 to plenums 22, 54 and passageway 24.

Figure 7:
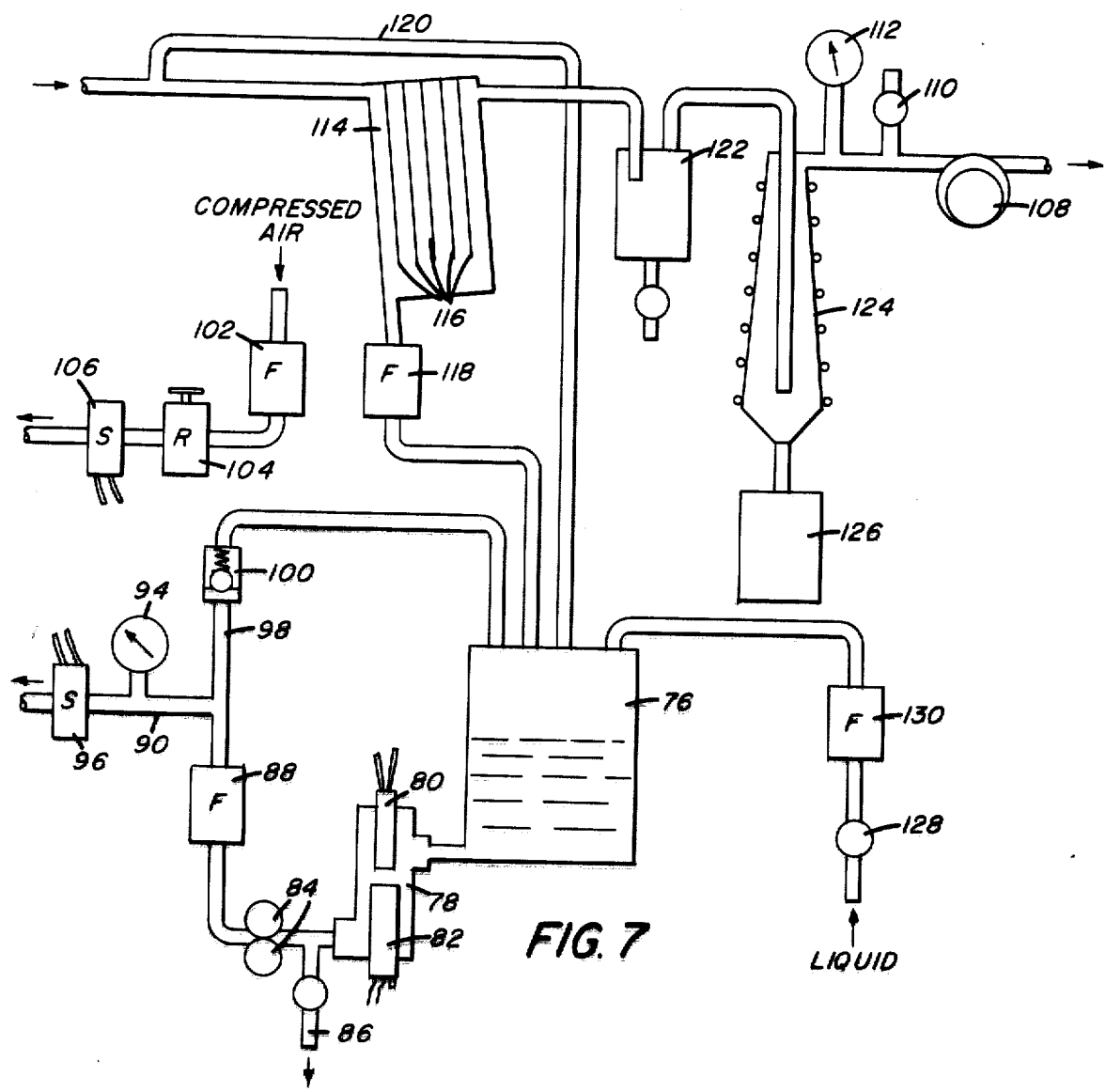
FIG. 7 is a schematic view illustrating the liquid and air system for supplying and removing liquid and air in succession from the film gate.

Referring to the essentially closed liquid and air supply system illustrated in FIG. 7, a main supply container 76 operating partially filled, supplies the liquid and receives the return liquid. Liquid flows from a low point in this container to a heat exchanger 78 where a heater 80 heats the liquid controlled by a thermostat 82. Since the system is operating at a reduced pressure, the evaporative cooling could reduce the temperature of the system to below the dew point. Should this happen, water would contaminate the system, which by experience, is known to be damaging to film. The heater 80-thermostat 82 combination prevents this from happening by maintaining the liquid temperature at a few degrees above room temperature. Liquid emerging from heat exchanger 78 flows to a pump 84. At the low point of the system a drain 86 is added for occasional clean out. Next the liquid is filtered through a filter 88 and flows upward to a Y in the system. One branch 90 leaving the Y horizontally carries liquid past a pressure gage 94 through a solenoid valve 96 to gate couplings 36, 64. The other branch 98 of the Y, vertically above the entering liquid stream, carries the liquid through a check valve used as a pressure relief valve 100 back to the main supply container 76. The geometry is such that the Y acts as a bubble trap. The pressure relief valve 100 is set to provide sufficient liquid pressure for rapid gate filling, but not enough to overload the limited ducting capacity of the liquid gate. Excess liquid from pump 84 flows through pressure relief valve 100 back to supply container 76. When liquid is cut off from the gate by solenoid valve 96, all of the liquid pumped returns through pressure relief valve 100 to supply container 76. Air at atmospheric pressure can be used for the gate purge. Faster action is provided, however, if compressed air is supplied for the purge. The air is preferably filtered through a filter 102 and then reduced in pressure by a pressure reducer 104 to balance the flow characteristics of the gate, and supplied to the gate as required through a solenoid valve 106. Vacuum is applied to the system, in particular to the liquid retrieval system, by any suitable vacuum pump 108. The degree of vacuum is controlled by a bleeder valve 110 that allows a controlled amount of air to bleed into the system ahead of vacuum pump 108. A gage 112 indicates the amount of vacuum applied to the system. As indicated earlier, vacuum applied to slots 20, 52; grooves 26, 56; plenums 22, 54 and passageway 24 in the liquid gate removes the liquid from the film areas. Liquid returning from the gate is mostly in droplet form and is drawn first through a mechanical separator 114 where droplets are removed. The separator 114 is preferably a container with baffles 116 around which the returning air-liquid mixture is drawn making a number of 180° turns. The droplets will touch and adhere to a baffle 116 or wall. The liquid droplets run down the baffle or wall and drain from the bottom of separator 114 through a filter 118 to the main supply container 76. A conduit 120 connects an opening at the top of the return line to supply container 76 to provide for pressure equalization across filter 118 and free drainage of separator 114. If for any reason filter 118 becomes plugged, a trap 122 will prevent any liquid overflowing from separator 114 from damaging vacuum pump 108. A condenser 124 and receiver 126 remove most of the evaporated liquid that escapes separator 114. The condenser 124 is preferably a conventional chill-wall type. However, to provide continuous use, the condenser is divided into two zones in which a timer controlling valving and integral heaters allows de-icing alternately one zone at a time. The resultant exhausted mixture is expected to be well below the acceptable tolerance when mixed with room air. The supply container 76 is filled by drawing the liquid from any suitable supply source through a valve 128 and filter 130.

In the operation of this invention, the movable gate member 44 is initially in an open position to permit the operator to insert a film frame 16 on the upper surface of film gate member 10 into abutting engagement with stop lip 17. The movable gate member 44 is then moved to its closed printing position as illustrated in FIG. 5. To make a print of the film frame, the vacuum pump 108 is energized causing air to be drawn from slots 20, 52 and cavities 14, 48. The solenoid 96 in the liquid supply is energized to introduce bubble-free liquid into passageways 34, 62 of the film gate members 10, 44. The liquid passes through passageways 34, 62; slits 40, 70 and cavities 14, 48 for cleaning both surfaces of the film frame and filling the cavities to provide a complete optical continuum rendering all film surface defects invisible during the projection operation. The liquid emerging from cavities 14, 48 enters slots 20, 52 and is drawn by vacuum back to the liquid supply to provide continuous liquid movement through the cavities. The printing of the film frame is initiated, and following the printing operation, the liquid supply solenoid 96 is de-energized and the air supply solenoid 106 energized for introducing air through passageways 34, 52; slits 40, 70 and cavities 14, 48 for drying the film frames, and then into slots 20, 52 where it is returned to the vacuum system. After the film has been dried, movable gate member 44 is moved to its open position and film frame 16 removed. The operation of the liquid and air supply solenoids 96, 106, the printing operation, etc. can be controlled in timed relation by any suitable timing mechanism or logic control circuit, not shown, activatable by movement of gate member 44 to its closed position for film printing.

The invention has been described in detail with particular reference to a preferred embodiment thereof, but it will be understood that variations and modifications can be effected within the spirit and scope of the invention as described hereinabove.

I claim:

1. In a liquid film gate for use in processing and printing individual film frames, the combination comprising:
    a fixed gate member having a first optical window defining a printing aperture, said first window having a first window surface;
    said fixed gate member further having first raised lands partially encircling said first window surface and a first slot encircling said first lands and said first window;
    a movable gate member in register with said fixed gate member and having a second optical window defining a printing aperture, said second window having a second window surface in register with said first window surface;
    said movable gate member further having a pair of second raised lands partially encircling said second window surface, and a second slot encircling said second lands and said second window;
    said movable gate member being movable relative to said fixed gate member between an open position in which it is spaced from said first gate member to permit insertion of a film frame therebetween, and a closed position in which said first and second windows are in registry, and said first and second lands are substantially in contact with opposite side surfaces of said film frame to support said film frame with said side surfaces cooperating with said first and second window surfaces to form cavities on each side of said film frame;
    means on said fixed and movable gate members operative when said movable gate member is in its closed position for successively directing and guiding a processing liquid into said cavities for filling said cavities, and drying air into said cavities for drying said film frame;
    said directing and guiding means comprising a passageway in each of said fixed and movable gate members in which one end of each passageway is connected to a source of liquid and the opposite end of each passageway is connected to a source of drying air;
    slits defined by said gate members for connecting each of said passageways to its corresponding cavity;
    vacuum means connected to at least one of said first and second slots for drawing said liquid and air into said cavities and across said side surfaces of said film frame in succession for processing and drying said film frame and exhausting said liquid and air; and
    bleeder holes defined by said gate members for connecting each of said passageways to said vacuum means.

2. The invention according to claim 1 wherein each of said passageways are of circular cross section, and said bleeder holes are tangential to said passageway.

3. The invention according to claim 1, and further comprising a first groove partially encircling said first slot and having ends of said first groove connected to said first slot;
    and a second groove partially encircling said second slot and having ends of said second groove connected to said second slot.

4. In a liquid film gate for use in processing and printing individual film frames, the combination comprising:
a first gate member having a first film engaging surface for engaging one side surface of a film frame and a first optical window defining a printing aperture in register with said film frame, and said window having a first window surface laterally displaced from said first film engaging surface and said one side surface of said film frame to form a first cavity;
a second gate member complementary to said first gate member, said second gate member having a second film engaging surface for engaging the opposite side surface of said film frame, and a second optical window in register with said first optical window and defining a printing aperture, said second window having a second window surface laterally displaced from said second film engaging surface and said opposite side surface of said film frame to form a second cavity;
said first and second gate members being movable relative to each other between an open position in which they are spaced apart to permit insertion of a film frame therebetween, and a closed position in which said first and second windows are in registry, and said first and second film engaging surfaces are substantially in contact with said one and opposite side surfaces of said film frame to support said film frame with said one and opposite side surfaces cooperating with said first and second window surfaces respectively to form cavities on each side of said film frame;
means on said first and second gate members operative when said gate members are in said closed position for successively directing and guiding a processing liquid into said cavities for filling said cavities, and drying air into said cavities for drying said film frame;
said directing and guiding means comprising a passageway in each of said gate members in which one end of each passageway is connected to a source of liquid and the opposite end of each passageway is connected to a source of drying air;
slits defined by said gate members for connecting each of said passageways to its corresponding cavity;
vacuum means connected to said cavities for drawing said liquid and air into said cavities and across said one and opposite side surfaces of said film frame in succession for processing and drying said film frame and exhausting said liquid and air; and
bleeder holes defined by said gate members for connecting each of said passageways to said vacuum means.

5. In a liquid film gate for use in processing and printing individual film frames, the combination comprising:
a first gate member having a first film engaging surface for engaging one side surface of a film frame and a first optical window defining a first printing aperture in register with said film frame, and said window having a first window surface laterally displaced from said first film engaging surface and said one side surface of said film frame to form a cavity;
a second gate member complementary to said first gate member, said second gate member having a second film engaging surface for engaging the opposite side surface of said film frame, and defining a second printing aperture in register with said first printing aperture;
said first and second gate members being movable relative to one another between an open position in which they are spaced from each other to permit insertion of a film frame therebetween, and a closed position in which said first and second apertures are in registry, and said first and second film engaging surfaces are substantially in contact with said one and opposite side surfaces of said film frame to support said film frame;
means on one of said first and second gate members operative when said gate members are in said closed position for successively directing and guiding a processing liquid into said cavity for filling said cavity, and drying air into said cavity for drying said film frame;
said directing and guiding means comprising a passageway in said one gate member in which one end of said passageway is connected to a source of liquid and the opposite end of said passageway is connected to a source of drying air;
a slit connecting said passageway to said cavity;
vacuum means connected to said cavity for drawing said liquid and air into said cavity and across said one side surface of said film frame in succession for processing and drying said film frame and exhausting said liquid and air; and
bleeder holes connecting said passageway to said vacuum means.

6. The invention according to claim 4 wherein each of said passageways are of circular cross section, and said bleeder holes are tangential to said passageway.

7. The invention according to claim 5 wherein said passageway is of circular cross section, and said bleeder holes are tangential to said passageway.

* * * * *

UNITED STATES PATENT OFFICE
CERTIFICATE OF CORRECTION

PATENT NO. : 3,893,763
DATED : July 8, 1975
INVENTOR(S) : Howard Ott

It is certified that error appears in the above-identified patent and that said Letters Patent are hereby corrected as shown below:

Column 3, line 34, delete the word "invention" and substitute the word --inverted--.

Column 5, line 67, after the word "top" insert the word --of--.

Column 8, line 25, delete the word "first" and substitute the word --fixed--.

Signed and Sealed this seventh Day of October 1975

[SEAL]

Attest:

RUTH C. MASON
*Attesting Officer*

C. MARSHALL DANN
*Commissioner of Patents and Trademarks*